May 12, 1959 V. H. VOGEL 2,886,750
ELECTRO-MECHANICAL POSITION INDICATOR SYSTEM
Filed Sept. 19, 1956 2 Sheets-Sheet 1
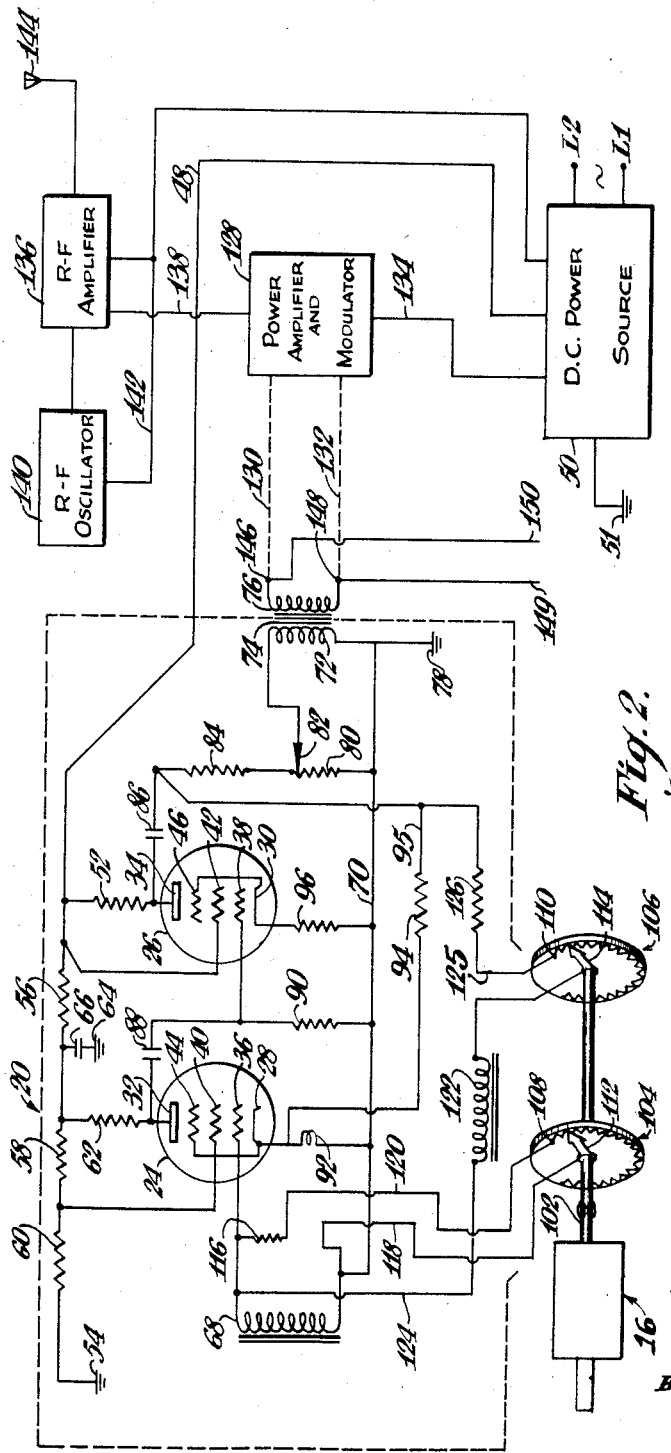
INVENTOR.
Vernon H. Vogel.
BY
HIS ATTORNEY.

May 12, 1959 V. H. VOGEL 2,886,750
ELECTRO-MECHANICAL POSITION INDICATOR SYSTEM
Filed Sept. 19, 1956 2 Sheets-Sheet 2

INVENTOR.
Vernon H. Vogel.
BY

HIS ATTORNEY.

United States Patent Office 2,886,750
Patented May 12, 1959

2,886,750

ELECTRO-MECHANICAL POSITION INDICATOR SYSTEM

Vernon H. Vogel, Fullerton, Calif., assignor to Robertshaw-Fulton Controls Company, Greensburg, Pa., a corporation of Delaware Application September 19, 1956, Serial No. 610,829

5 Claims. (Cl. 318—16)

This invention relates to position indicating systems and more particularly to a system capable of indicating position over an unlimited distance.

Conventional position indicating systems usually employ synchros or selsyns in their systems which require a five wire transmission line, and are designed to operate at a single frequency. Although these systems serve their intended purpose, they have been found unadaptable for transmitting signals over long transmission lines or over radio frequency broadcast systems without complicated accessory equipment.

Other conventional systems use a fixed tuned discriminator and a servo system which balances the voltage output of the discriminator against a standard source. This type of system is limited by the difficulty in obtaining a linear voltage-frequency output from the discriminator over a wide band of frequencies as well as the difficulty in maintaining calibration stability of such a system. For applications such as guided missile control, it is desirable and a necessity that the position indicating or controlling system maintain calibration stability and employ a minimum amount of accessory equipment and parts.

It is an object of this invention to produce a position indicating system wherein the position of a controlled member is a function of frequency and is not limited to any one frequency or range of frequencies.

Another object of this invention is to produce a position indicating system which employs either a two-wire transmission line or audio frequency broadcast to transmit a signal an unlimited distance to a station where position indication is required.

Another object of this invention is to transmit a position indicating signal which is independent of factors such as source voltage, phase shift, transmission line impedance, and amplitude attenuation due to transmission media.

Another object of this invention is to produce a discriminator circuit in which the frequency for zero output voltage may be varied over a wide range of frequencies in a linear manner.

Another object of this invention is to produce a position indicator which is electrically and remotely controlled.

In the preferred embodiment of the invention, a transmitting system includes an audio frequency oscillator in which the frequency control system includes a resistor and an inductive reactance connected in series. Any change in the impedance of the frequency control system causes a corresponding change in the frequency of the oscillator from a predetermined reference frequency. A potentiometer is provided in the frequency control circuit and is mechanically coupled to an external mechanism whose angular position with respect to some reference point is to be indicated at a remote station. Any change of position of the external mechanism will cause a change in impedance of the frequency control circuit by means of the potentiometer, and hence a change in the signal frequency. The signal voltage is amplified and transmitted by a two-wire transmission system or by radio frequency broadcast to a receiving station.

The receiving station includes a receiver having a frequency-sensitive network consisting of a potentiometer and an inductance forming a portion of a bridge circuit which is balanced at the voltage of the reference frequency of the signal frequency. This latter voltage constitutes the initial voltage and corresponds to the reference frequency of the frequency-sensitive network, and the frequency control system of the transmitting system. A change in the input signal frequency causes unbalance in the network, causing a differential voltage to be generated in the frequency-sensitive network which is amplified and fed into a low-inertia two-phase servo motor. The servo motor is coupled to an indicator pointer and also to the potentiometer in the frequency-sensitive network. The shaft to the servo motor rotates until the resistance of the potentiometer is equal to the reactance of the inductance whereupon the respective voltages become equal, balancing the network and nullifying the differential voltage of the system. The angular displacement of the servo motor shaft is indicative of the position of the external mechanism coupled to the potentiometer in the transmitter section.

Other objects and advantages of this invention will become apparent from the following description taken in connection with the accompanying drawing wherein:

Fig. 1 is a schematic showing two remotely positioned stations utilizing the invention;

Fig. 2 is a schematic drawing of the transmitting system of the invention; and

Figure 3:
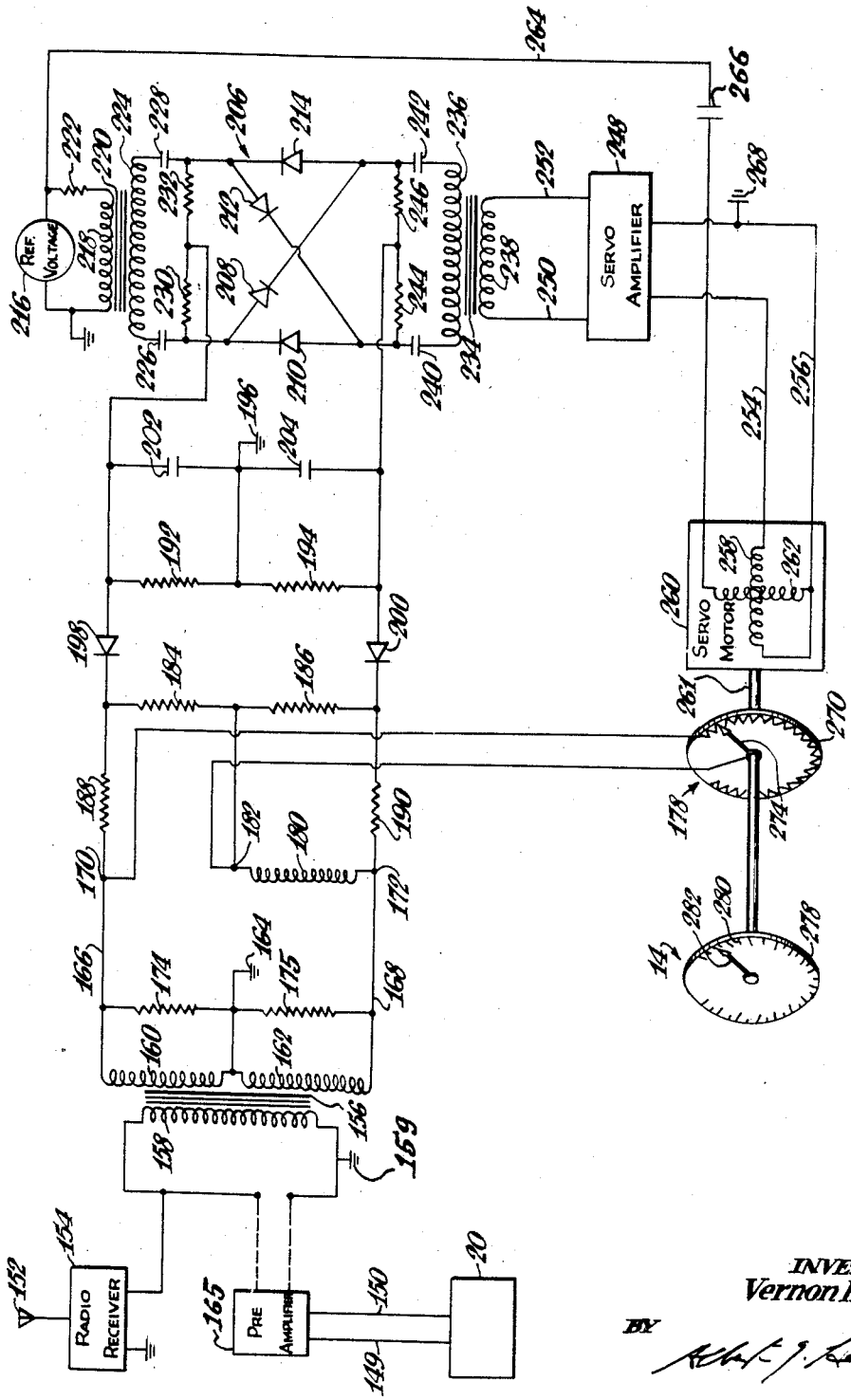
Fig. 3 is a schematic drawing of the receiving system of the invention.

Referring more particularly to the drawings, Fig. 1 illustrates two remotely positioned stations 10 and 12 which are respectively provided with a transmitter-receiver unit, position indicators 14 and 14' and rotatable means 16 and 16', the position of which is to be indicated. Transmission means links the stations 10 and 12, and this means may comprise a two-wire transmission line or radio waves as indicated.

Referring now to Fig. 2, each of the transmitting sections of the stations 10 and 12 includes a bridge audio-frequency oscillator indicated generally by the reference numeral 20. The oscillator 20 includes a pair of pentode tubes 24, 26 having cathodes 28, 30, anodes 32, 34, control grids 36, 38, screen grids 40, 42 and grids 44, 46, respectively. A conductor 48 has one end thereof connected to a source of D.C. voltage 50 which is grounded at 51 and energized by an A.C. source $L_1$, $L_2$, and the other end thereof connected to the anode 34 through a resistance 52. The anode 34 is also connected to ground at 54 through three series resistors, 56, 58, 60. The anode 32 is connected through a resistance 62 to the junction of the resistors 56, 58. A ground connection 64 is also made intermediate the resistors 56, 58 through a capacitor 66.

The grid 40 of the tube 24 is connected to the junction of the resistors 58, 60 and the grid 42 is connected to the junction of the resistors 52, 56. Both grids 44, 46, are electrically connected to the cathodes 28, 30, respectively as indicated in Fig. 2.

The control grid 36 of the tube 24 is connected to one end of a coil 68, the other end of which is connected by a conductor 70 to one end of a primary 72 of a transformer 74 having a secondary 76. The primary 72 has the said end thereof connected to ground at 78 and the other end thereof connected to a resistor 80 by means of an adjustable tap 82. One end of the resistor 80 is connected to the conductor 70 and the other end thereof is connected in series through a resistor 84 and a capacitor 86 to the anode 34.

The anode 32 of the tube 24 is connected through a capacitor 88 and a resistor 90 to the conductor 70. The grid 38 is connected intermediate the resistor 90 and capacitor 88. The cathode 28 is connected through a filament 92 of an incandescent lamp to the conductor 70 and through a resistor 94 by conductor 95 to the junction of the capacitor 86 and resistor 84. The cathode 30 is connected through a resistance 96 to the conductor 70.

To change the frequency of oscillation of the circuit 20 in response to a change in a mechanical signal, the mechanism 16, which may be rotated mechanically or manually, is provided with a rotatable shaft 102 which is coupled to two potentiometers 104, 106. The potentiometers 104, 106 are of known form and include a pair of stationary circular resistors 108, 110 which are cooperable with a pair of adjustable center taps 112, 114, respectively, carried by the shaft 102. The potentiometer 104 is connected in parallel with coil 68 and in series with a resistor 116 by means of conductors 118, 120. The center tap 114 of the potentiometer 106 is connected in series with a coil 122 to the grid side of the coil 68 by a conductor 124. One end of the resistance 110 is connected by a conductor 125 through a resistance 126 to the junction of the capacitor 86 and resistor 84.

In the circuitry thus far described, the frequency of oscillation is determined by the values of the resistances 116, 126 connected in series with their associated potentiometers. When the shaft 102 is rotated by the mechanism 16 from a reference position to a new angular position, the resistances of the potentiometers 104, 106 will change equal amounts, and the resulting change in frequency over the reference frequency is proportional to these resistances. The new frequency will be the sum of the reference frequency plus the change in frequency.

The equivalent voltage corresponding to the frequency of the oscillator 20 is induced in the secondary 76 of the transformer 74 which is connected to a power amplifier and modulator 128 by conductors 130, 132. The power amplifier and modulator 128 is connected by a conductor 134 to the D.C. source 50 and is coupled to an R.F. amplifier 136 by a conductor 138. An R.F. oscillator 140 is energized by the source 50 by means of a conductor 142 and has the output thereof coupled to the amplifier 136 which in turn is energized by the conductor 142 and coupled to an antenna 144. When radio transmission is not desired, the output of the secondary 76 may be taken directly therefrom by means of terminals 146, 148 and transmitted by a two-wire transmission system 149, 150 as later will become apparent.

As previously described, the signal frequency will be the sum of the reference frequency plus the change in frequency. The equivalent voltage corresponding to the sum of these frequencies is amplified by the modulator 128 which modulates the radio frequency amplifier 136. This modulated signal is transmitted to the antenna 144 and to the receiving system now to be described.

Referring to Fig. 3, the receiving section includes an antenna 152 which is adapted to receive a signal from the antenna 144 and is coupled to a radio receiver type system 154 where the signal is suitably amplified. A transformer 156 is provided with a primary winding 158 which is coupled to the radio receiver 154 and grounded at the opposite terminal as at 159, and a secondary winding comprising two equal series-connected windings 160, 162 which have their common junction grounded at 164. For transmission by the two-wire system, the conductors 149, 150 may be connected to the input side of a preamplifier 165. The output side of the preamplifier 165 may be connected directly to the primary 158.

Conductors 166, 168 extend from the oppositely disposed ends of the winding 160, 162 and are provided with terminals 170, 172. Two equal resistances 174, 175 are connected across the secondaries 160, 162 and are center tapped and grounded at 164. This arrangement establishes a voltage at each of the terminals 170, 172 of equal magnitude with respect to ground potential and 180° out of phase with each other.

The voltages produced at terminals 170, 172 are impressed on the RL network comprising a potentiometer 178 and a reactance 180 serially connected between the terminals 170, 172 and having a common junction at 182. The voltage at terminal 182 with respect to ground voltage is equal to that at terminals 170, 172, but its phase relationship is dependent on the ratio of the resistance 178 and reactance 180. At the reference frequency previously described in connection with the transmitter the reference voltage at terminal 182 is 90° out of phase with either voltage at terminals 170, 172.

A pair of resistors 184, 186 are serially connected across the conductors 166, 168 and have the common terminal thereof connected to the terminal 182. A pair of resistors 188, 190 are connected in the conductors 166, 168, the resistor 188 being connected between the terminal 170 and resistor 184 and the resistor 190 being connected between the terminal 172 and the resistor 186.

A detector network is coupled to the conductors 166, 168 and includes a pair of resistors 192, 194 serially connected between the conductors 166, 168 and having their common junction connected to ground at 196. A diode rectifier 198 is connected between the resistors 184, 192 by the conductor 166 and a diode rectifier 200 is connected between the resistors 186, 194 by the conductor 168. A pair of capacitors 202, 204 are serially connected across the conductors 166, 168 and have the common junction grounded at 196.

In the circuitry of the receiving station thus far described, the voltage at terminal 182 with respect to ground is equal to the voltage at terminals 170, 172, but its phase relationship is dependent on the ratio of the resistance 178 and the reactance 180. At the reference frequency, the voltage at 182 is 90° out of phase with either terminal 170, 172. The sum of the voltages at terminals 170, 182 is taken through the resistors 188, 184 and rectified by the diode 198 and applied to charge the capacitor 202. Similarly, the sum of the voltages at terminals 172, 182 is taken through resistors 186, 190, rectified by the diode 200, and used to charge the capacitor 204. At the reference frequency, the voltages across the capacitors 202, 204 are equal since they are connected in series opposition. Thus, the net output voltage will be zero.

The output voltage of the detector is fed to a conventional polarity sensitive phase reversing circuit such as fully described in pages 145–146 of "Transistor Circuit Engineering" by Shea (published by Wiley). Such circuit includes a diode bridge modulator indicated generally by the reference numeral 206 and containing diodes 208, 210, 212, and 214. A 60 cycle reference voltage generator 216 is connected across the primary 218 of a transformer 220 in series with a resistor 222. A secondary 224 of the transformer 20 has the ends thereof connected through a pair of capacitors 226, 228 to the diode bridge. A pair of resistors 230, 232 are serially connected across the secondary 224 and have their common junction connected to the conductor 166. An output transformer 234 has a primary 236 coupled to the diode network and a secondary 238. A pair of capacitors 240, 242 are connected in series with the primary 236, and a pair of resistors 244, 246 are serially connected across the primary 236 and have their common junction thereof connected to the conductor 168. The output voltage from the detector is thus fed to the diode bridge modulator 206 by the conductors 166, 168. The resistors 230, 232 and 244, 246 prevent the detector from being loaded by the modulator 206.

The signal voltage from the detector is modulated by the modulator 206 and fed through the output transformer 234 to a servo-amplifier unit 248 by conductors 250, 252. The servo-amplifier 248 is provided with output conductors 254, 256 which are connected to opposite ends of the control winding 258 of a servo-motor 260 having a rotatable shaft 261. The other winding 262 of the servo-motor is connected at one end to the reference source 216 by a conductor 264 and at the other end to the conductor 256. A capacitor 266 is connected between control winding 262 and conductor 264. The servo-amplifier and the control winding are grounded at 268. The capacitor 266 serves for tuning the output circuit as well as for providing a voltage phase in quadrature with the reference voltage in the servo-motor 260.

As long as the output voltage due to signal exists in the coil 258, the servo-motor 260 is active and its shaft will rotate. This rotation of the servo-motor is utilized to balance the frequency-sensitive network comprising the coil 180 and potentiometer 178. To this end, the potentiometer 178 includes a circular resistor 270 which is connected at one end to the terminal 170, and a slider 274 which is fixed to the shaft 261 for rotation therewith and connected to the terminal 182. It will be apparent that shaft 261 will rotate until the resistance of the potentiometer 178 is equal to the reactance of the coil 180 whereupon rotation will cease. It will thus be appreciated that the impedance ratio between coil 180 and potentiometer 178 reflects increases or reductions in the incoming frequency with respect to the reference value, and actuates the associated servo system to restore the impedance ratio to unity. The angular position of the potentiometer shaft will correspond to the differential voltage equivalent to the signal frequency of the transmitting system.

The position indicator 14 includes a fixed circular face 278 having a plurality of indicia 280 and a pointer 282 carried by the shaft 261. As shown in Fig. 1, the face 278 and pointer 282 may be mounted in the front of the receiver case to give visual indication of the position of the shaft 261.

By way of illustration and example, and not by way of limitation, the following tables list a set of values for the various circuit elements shown in the drawings:

Resistances, ohms:

| | |
|---|---|
| 52 | 8,000 |
| 56 | 10,000 |
| 58 | 33,000 |
| 60 | 36,000 |
| 62 | 100,000 |
| 80 | 25,000 |
| 84 | 110,000 |
| 90 | 560,000 |
| 92 | 3 watt Mazda lamp |
| 94 | 3,000 |
| 96 | 820 |
| 104 | 5,000 |
| 106 | 5,000 |
| 116 | 6,800 |
| 126 | 6,800 |
| 174 | 100,000 |
| 175 | 100,000 |
| 178 | 5,000 |
| 184 | 5,500 |
| 186 | 5,500 |
| 188 | 5,500 |
| 190 | 5,500 |
| 192 | 50,000 |
| 194 | 50,000 |
| 222 | 47 |
| 230 | 18,000 |
| 232 | 18,000 |
| 244 | 18,000 |
| 246 | 18,000 |

Capacitances, microfarads:

| | |
|---|---|
| 66 | 25 |
| 86 | 1.75 |
| 88 | .5 |
| 202 | 1.75 |
| 204 | 1.75 |
| 226 | .01 |
| 228 | .01 |
| 240 | .01 |
| 242 | .01 |
| 266 | 2 |

Inductance coils, henrys:

| | |
|---|---|
| 68 | 3.18 |
| 122 | 3.18 |
| 180 | 3.18 |

Tubes:

| | |
|---|---|
| 24 | 6AU6 |
| 26 | 6AQ5 |

Transformers, ohms:

| | |
|---|---|
| 74 | 600 to 50,000 |
| 156 | 20,000 to 3,000 |
| 220 | 15,000 to 60,000, center tapped |
| 234 | 15,000 to 60,000, center tapped |

*Operation*

In summing up the operation of the position indicating system, assume that the reference frequency is received from the transmitter unit, with no rotation of the potentiometers 104, 106 provided therein. Under these circumstances, the voltage to ground across secondary winding 160 is rectified by means of rectifier 198 and filtered by means of capacitor 202 and resistor 192. Conversely, the voltage to ground across secondary winding 162 is rectified by means of rectifier 200 and filtered by means of capacitor 204 and resistor 194.

Because of absence of any error signal, the subtractively related potentials on the capacitors 204 and 202 cancel each other out. It should be emphasized that during this null condition, the inductive reactance of coil 180 is identically equal to the ohmic resistance of the potentiometer 178. The voltage drop across the potentiometer 178 is sampled by the diode 198 and associated circuitry. Conversely, the voltage drop across the coil 180 is sampled by the diode 200 and associated circuitry.

However, the symmetrically subtractive relationship between the respective voltage drops across coil 180 and potentiometer 178 prevents any net electrical unbalance in the circuit. Assume now that the external mechanism 16 is actuated to change the angular position of the shaft 102. Such rotation of the shaft 102 will vary the resistance of the potentiometers 104, 106 and thereby effect a change in frequency of oscillator 20. A signal frequency will thus be established which is the sum of the reference frequency and the change in frequency.

An equivalent voltage corresponding to the sum of the reference frequency and change in frequency is impressed on the power amplifier and modulator 128 and amplified thereby. This amplified signal modulates the R.F. signal of the amplifier 136 and is transmitted to the antenna 144.

At the receiving station, the signal is received by the antenna 152 and radio receiver system 154 and then impressed on the frequency-sensitive network including the coil 180 and potentiometer 178. The frequency-sensitive network senses the signal frequency and produces a voltage equivalent to the change of frequency with respect to the reference frequency. More particularly, in the case where the total frequency received is greater than the reference frequency taken alone, the inductive reactance of the coil 180 increases sharply. This destroys the null condition, and causes the reactance of coil 180 to exceed the ohmic value of potentiometer 178. More important, however, is the fact that the voltage drops across the resistor and the coil are now unequal. Thus, the symmetrically subtractive relationship between these voltage drops is destroyed, and a voltage difference across the capacitors 202 and 204 now exists. This voltage is then fed into the diode detector which produces a differential voltage output to be impressed on the modulator 206. The voltage output from the modulator is amplified by the servo-amplifier 248, the output of which is supplied across the control winding 258 of the servo motor 260. The servo motor 260 rotates the shaft 261 until the resistance of the potentiometer 178 equals the inductive reactance of the coil 180. Thus, the shaft 261 is displaced angularly an amount equal to the angular displacement of the shaft 102 of the transmitting system. Accordingly, indicator 14 will give visible indication of the change in angular position of the shaft 102.

Since the performance characteristics of the receiving and transmitting systems are identical, the operation of either system is independent of phase shift and relatively independent of amplitude variations. These systems can be used to transmit and receive position signals between remotely located stations with none of the usual limitations of accuracy imposed on synchro type systems. The audio-frequency oscillator 20 can be transistorized, thereby providing a low level output particularly applicable for unattended telemetering installations at remote stations.

It will be apparent that the position indicating system herein described is capable of numerous applications. One such application is in an aircraft or guided missile. For example, in an aircraft the degree of roll can be indicated to the pilot, or to a remote station by the angular displacement of the potentiometer shaft 261 with reference to an azimuth. As previously described, such displacement of a potentiometer shaft produces a signal which causes a corresponding displacement of the potentiometer shaft in the receiving system to thereby indicate the change in position of the variable.

It will be apparent that a plurality of transmitters and a corresponding number of receivers may be incorporated in one unit at one station to transmit and receive signals from different shaft positions. For example, a three-channel positioner system can transmit and receive three different signals at three different frequency ranges:

Channel 1=350–600 c.p.s.
Channel 2=750–1300 c.p.s.
Channel 3=1600–2750 c.p.s.

While only one embodiment of this invention has been herein shown and described, it will be apparent to those skilled in the art that many changes in the construction and arrangement of parts may be made without departing from the scope of the invention as defined in the appended claims.

It is claimed and desired to secure by Letters Patent:

1. In a control device, the combination comprising means for generating an electrical signal of variable frequency, means movable between positions for changing the frequency of said signal, transformer means having a primary winding and a secondary winding provided with a grounded center tap and connected to receive said signal at a remote location, means including a series connected inductance and variable resistance connected in shunt across said transformer means for establishing a voltage related to the changes in said frequency of said signal in accordance only with variations in the impedance ratio between said inductance and variable resistance, and means movable between positions in response to a change in said voltage, the position of said voltage responsive means being indicative of the position of said frequency changing means.

2. In a control device, the combination comprising an oscillator circuit for generating an electrical signal, a frequency control circuit for said oscillator including a variable impedance, means movable between a plurality of positions for changing the value of said impedance to change the frequency of said signal, a multi-winding transformer, a frequency sensitive network including a fixed impedance and at least one variable impedance connected in parallel across one winding of said transformer and coupled to said oscillator circuit thereby for producing a voltage proportional only to changes in the impedance ratio between said fixed and variable impedances to reflect the changes in the frequency of said signal, a second member movable between a plurality of positions, and means for actuating said second member in response to a change in the voltage produced by said frequency sensitive network.

3. In a control device, the combination comprising an oscillator circuit for generating an alternating signal, a frequency control circuit for said oscillator circuit including a variable resistance, a member movable between a plurality of positions for varying the value of said resistance to change the frequency of said signal, a frequency sensitive network including a transformer provided with a tapped secondary winding having a fixed impedance and at least one variable impedance connected thereacross to detect changes in the impedance ratio which accompany changes in frequency of said signal, a second member operable only in response to said changes in said impedance ratio and movable between a plurality of positions, and means energized by deviation in said impedance ratio for actuating said second member, the position of said second member being indicative of the position of said first member.

4. In a control device, the combination comprising an oscillator circuit for generating an alternating signal, a frequency control circuit for said oscillator including a variable impedance, a member movable between a plurality of positions for changing the value of said impedance to change the frequency of said signal, a frequency sensitive network including a fixed impedance and at least one variable impedance for producing a unidirectional differential voltage related to the impedance ratio therebetween which reflects changes in frequency of said signal, a second member movable between a plurality of positions, means for actuating said second member in response to a change in said differential voltage produced by said frequency sensitive network, and means for restoring the value of said impedance ratio to a predetermined value in response to movement of said second member.

5. In a control device, the combination comprising an oscillator circuit for generating an alternating signal, a frequency control circuit for said oscillator including a variable resistance, a member movable between a plurality of positions for changing the value of said resistance to change the frequency of said signal, means operative to receive said signal including fixed and variable impedances having an impedance ratio which deviates from a preset value with each change in the frequency of said signal, means operative to be electrically energized by a unidirectional differential voltage related to changes in said impedance ratio motor means movable between a plurality of positions and operatively connected to the last said means to be energized thereby, and means operatively connected to said motor means and responsive to energization of the said electrically energized means to effect a change in said variable impedance to restore said impedance ratio to said pre-set value.

References Cited in the file of this patent
UNITED STATES PATENTS

| | | |
|---|---|---|
| 2,437,558 | Rockwood | Mar. 9, 1948 |
| 2,553,208 | Petroff | May 15, 1951 |
| 2,565,540 | Williams | Aug. 28, 1951 |
| 2,760,132 | Pawley | Aug. 21, 1956 |
| 2,830,241 | Turck | Apr. 8, 1958 |